(12) United States Patent
Meincke, II et al.

(10) Patent No.: US 11,458,061 B1
(45) Date of Patent: Oct. 4, 2022

(54) CONTROL OF MULTIPLE JOINTS OF AN UPPER BODY SUPPORT SYSTEM

(71) Applicant: Empower Robotics Corporation, Lexington, MA (US)

(72) Inventors: John W. Meincke, II, Medfield, MA (US); Kosuke Takeuchi, Waltham, MA (US); Sheng Liu, Cambridge, MA (US); Haruhiko Harry Asada, Lincoln, MA (US)

(73) Assignee: Empower Robotics Corporation, Lexington, MA (US)

( * ) Notice: Subject to any disclaimer, the term of this patent is extended or adjusted under 35 U.S.C. 154(b) by 368 days.

(21) Appl. No.: 16/827,340

(22) Filed: Mar. 23, 2020

Related U.S. Application Data

(60) Provisional application No. 62/821,898, filed on Mar. 21, 2019, provisional application No. 62/821,902, filed on Mar. 21, 2019.

(51) Int. Cl.
*A61H 1/02* (2006.01)
*A47C 16/00* (2006.01)

(52) U.S. Cl.
CPC ........... *A61H 1/0229* (2013.01); *A47C 16/00* (2013.01); *A61H 2201/0192* (2013.01);
(Continued)

(58) Field of Classification Search
CPC . A61H 3/00; A61H 3/04; A61H 3/008; A61H 1/0266; A61H 1/0244; A61H 1/024; A61H 2201/1238; A61H 2201/5061; A61H 2201/5097; A61H 2201/5007; A61H 2003/043; A61H 2201/5064; A61H 2201/0107; A61H 2201/123; A61H 2201/5069; A61H 2201/5084; A61H 1/0277; A61H 2201/5071; A61H 1/0229; A61H 2201/0192; A61H 2201/1635; A61H 2201/1652; A61H 2201/1659;
(Continued)

(56) References Cited

U.S. PATENT DOCUMENTS

| 5,667,461 A * | 9/1997 | Hall | A63B 69/0064 482/54 |
| 6,666,831 B1 * | 12/2003 | Edgerton | A63B 69/0064 600/595 |

(Continued)

*Primary Examiner* — Garrett K Atkinson
(74) *Attorney, Agent, or Firm* — Spano Law Group; Joseph S. Spano

(57) ABSTRACT

Methods and system to partially support the weight of a human user engaged in task performance at ground level are presented herein. An upper body support system includes multiple degrees of freedom to adapt the physical geometry of the support system to meet the demands of the task at hand. Each degree of freedom of the upper body support system is passively controlled by the human user from a convenient user interface. In some embodiments, each end-effector of the support system is positioned and fixed in three degrees of freedom over a relatively large workspace by manually controlling the brake torque of two rotational joints and the state of a locking mechanism of a linear joint. In another aspect, an end-effector is removeably attached to the support system with a quick-change coupler. In some embodiments, a swivel joint mechanism compensates for misalignment with the work environment.

20 Claims, 14 Drawing Sheets

(52) U.S. Cl.
CPC ............ *A61H 2201/1635* (2013.01); *A61H 2201/1652* (2013.01); *A61H 2201/1659* (2013.01); *A61H 2203/045* (2013.01)

(58) Field of Classification Search
CPC ........ A61H 2203/045; A63B 21/00181; A63B 21/4009; A63B 69/0064; A63B 21/4025; A63B 24/0087; A63B 21/0058; A63B 71/0054; A63B 21/152; A63B 21/00178; A63B 26/003; A63B 21/157; A63B 2024/0093; A63B 2220/803; A63B 2220/51; A63B 2071/0072; A63B 2220/16; A63B 2225/50; A63B 2071/025; A63B 2220/89; A63B 2225/20; A63B 2071/0655; A63B 2220/40; A63B 2022/0092; G09B 19/003; A47C 16/00
See application file for complete search history.

(56) References Cited

U.S. PATENT DOCUMENTS

| | | | | |
|---|---|---|---|---|
| 7,331,906 B2* | 2/2008 | He | ................ | A61H 1/0237 482/69 |
| 7,887,471 B2* | 2/2011 | McSorley | .......... | A63B 21/0552 482/136 |
| 7,998,040 B2* | 8/2011 | Kram | ................ | A63B 21/055 482/54 |
| 8,057,410 B2* | 11/2011 | Angold | ................ | A61H 3/00 601/5 |
| 8,608,479 B2* | 12/2013 | Liu | ................ | A61H 3/04 434/255 |
| 9,205,017 B2* | 12/2015 | Doyle | ................ | B25J 9/0006 |
| 11,141,341 B2* | 10/2021 | Koltzi | ................ | A63B 22/00 |
| 2004/0204294 A2* | 10/2004 | Wilkinson | ........... | A63B 22/203 482/52 |
| 2005/0101448 A1* | 5/2005 | He | ................ | A61H 1/0255 482/69 |
| 2008/0300118 A1* | 12/2008 | Wehrell | ................ | A63B 21/169 482/129 |
| 2010/0204804 A1* | 8/2010 | Garrec | ................ | A61H 1/0277 623/24 |
| 2011/0313331 A1* | 12/2011 | Dehez | ................ | A61H 1/0285 601/33 |
| 2012/0184880 A1* | 7/2012 | Doyle | ................ | B25J 9/0006 601/33 |
| 2013/0130866 A1* | 5/2013 | Wehrell | ............. | A63B 69/0079 482/112 |
| 2013/0225371 A1* | 8/2013 | Harrer | ................ | A63B 21/4017 482/8 |
| 2015/0297934 A1* | 10/2015 | Agrawal | ............. | A61H 1/0266 482/4 |
| 2019/0176320 A1* | 6/2019 | Smith | ................ | B25J 9/1689 |
| 2019/0336381 A1* | 11/2019 | Koltzi | ................ | A61H 1/0285 |
| 2019/0343707 A1* | 11/2019 | Riener | ................ | A61H 1/0277 |
| 2020/0009719 A1* | 1/2020 | Scattareggia Marchese | ............. | A61F 2/74 |

* cited by examiner

CONTROL OF MULTIPLE JOINTS OF AN UPPER BODY SUPPORT SYSTEM

CROSS REFERENCE TO RELATED APPLICATIONS

The present application for patent claims priority under 35 U.S.C. § 119 from U.S. provisional patent application Ser. No. 62/821,898, entitled "User Interface For Adjusting Limb Position And Length Of A Wearable Exoskeleton," filed Mar. 21, 2019, and from U.S. provisional patent application Ser. No. 62/821,902, entitled "End Effector Coupling To A Wearable Exoskeleton," filed Mar. 21, 2019, the subject matter of each is incorporated herein by reference in its entirety.

TECHNICAL FIELD

The described embodiments relate to systems and methods for control of a wearable mechanical structure to stably support a human user over a range of mechanical positions.

BACKGROUND INFORMATION

Many labor related activities require workers to perform tasks in ergonomically awkward positions that can be unstable and sometimes unsafe for the workers. In one example, a worker is required to perform tasks at ground level. Typically, this requires a worker to bend forward from a standing position, crouch down and bend forward, or sit down on both knees and bend forward to reach the workpiece. Any of these postures can cause muscle fatigue and often lead to chronic back pain and injuries. In addition, a worker might use one or both hands to support the body at ground level, which reduces productivity. Various pads and support structures have been developed in an attempt to ease the strain that may develop while performing tasks at ground level for an extended period of time. However, in large measure, these approaches have not significantly reduced the toll on the human body when performing tasks at ground level. Improvements to support gear available to stably support a human user with minimal intrusion while the human user performs work tasks at ground level are desired.

SUMMARY

Methods and system to partially support the weight of a human user engaged in task performance at ground level are presented herein. In particular, an upper body support system includes multiple degrees of freedom to adapt the physical geometry of the support configuration to meet the demands of the task at hand. Each degree of freedom of the upper body support system is passively controlled by the human user from a convenient user interface.

In one aspect, the end-effector of each body support limb can be positioned and fixed in three degrees of freedom over a relatively large workspace by controlling braking of two rotational joints and controlling locking of a linear joint. In these embodiments, a convenient user interface allows a human user to place a hand on a handle of the body support limb and control the position of the end-effector of the body support limb with respect to the harness from the handle. At the handle, the human user operates a brake control lever to alternately apply and release the brakes of two rotational joints and a limb lock control lever to alternately lock and unlock the linear joint. When the brakes are released, the linear joint is unlocked, or both, the human user can reposition the body support limb by freely moving the body support limb with respect to the harness. When the desired position is reached, the human user applies the brakes, locks the linear joint, or both, to fix the position of the body support limb with respect to the harness. The forces required to operate the brake control lever and to operate the limb lock control lever are low enough for a human user to easily operate in a passive manner. Similarly, the forces required to reposition the body support limb when the brakes are released, the linear joint is unlocked, or both, are low enough for a human user to easily maneuver in a passive manner.

In another aspect, an end-effector is removeably attached to each body support limb with a quick-change coupler. In this manner, a human user can select the most effective style of end effector to suit a particular task environment and the type of body support required to perform a task. The force required to operate the quick-change coupler is low enough for a human user to passively attach/detach the end-effector without the use of an additional tool. In some embodiments, a swivel joint mechanism is included between the quick-change coupler and the end-effector to compensate for misalignment, allowing a ground facing surface of the end-effector to fully contact the task environment.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and system to partially support the weight of a human user engaged in task performance at ground level are presented herein. In particular, an upper body support system includes multiple degrees of freedom to adapt the physical geometry of the support configuration to meet the demands of the task at hand. Each degree of freedom of the upper body support system is passively controlled by the human user from a convenient user interface.

Figure 1:
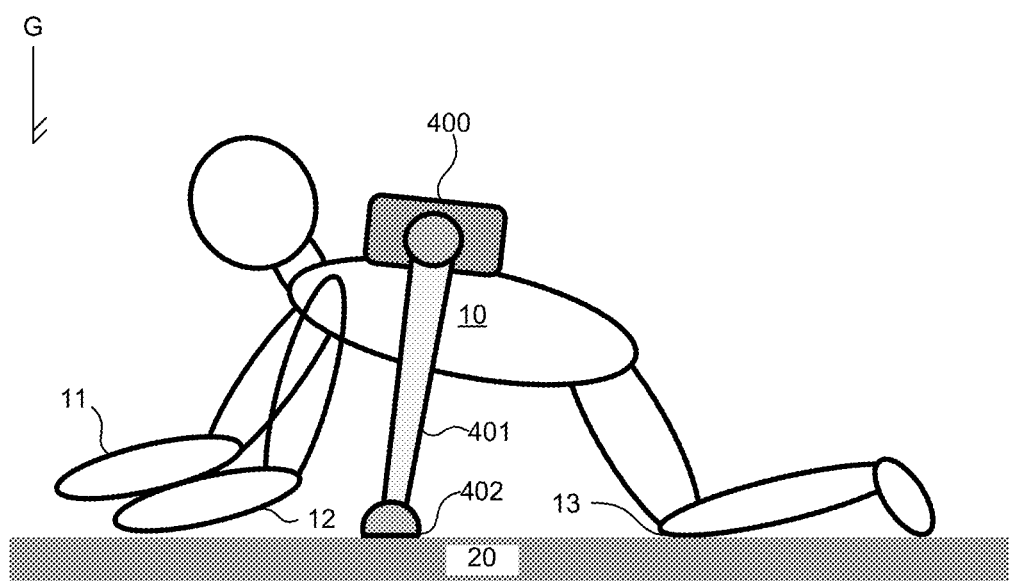
FIG. 1 is a diagram illustrative of an upper body support system 400 in one operational scenario.

FIG. 1 is a diagram illustrative of an upper body support system 400 in one operational scenario.

Upper body support system 400 passively supports the upper body of a human user working at or near the ground. In one aspect, upper body support system 400 braces the torso of a human user against a surface of the work environment. This frees the hands and arms of the human user that would otherwise be occupied supporting the human torso. Thus, a human user is able to comfortably use both hands to execute a particular work task. The upper body support system includes one or more passive upper body support assemblies 401 each including an extensible body support limb that extends toward the surface of the working environment and supports the human user.

As depicted in FIG. 1, upper body support system 400 is attached to the torso 10 of a human user with a harness assembly. Two upper body support assemblies 401 are coupled to the harness assembly, one on each side of the body of the human user (i.e., in the direction perpendicular to the drawing sheet). As depicted in FIG. 1, the human user is working on the ground surface 20 oriented perpendicular to the gravity vector, G. The human user is stably supported at the ground surface at contact areas 13 associated with each knee and at contact areas 402 associated with each upper body support assembly 401. As depicted in FIG. 1, the upper body of the human user is stably supported by upper body support system 400 without the use of hands 11 and 12. In this manner both hands 11 and 12 are available to perform a task at or near the ground surface 20.

In the example depicted in FIG. 1, the upper body support system 400 is located near the center of mass of the human torso, and is configured to support most of the weight associated with the human torso. This reduces the loading on the knees, feet, and back of the human user compared to crouching or kneeling in a conventional manner. As depicted in FIG. 1, the knees of the human user are comfortably posed, for example at angles between ninety degrees and one hundred thirty five degrees. The knees do not have to be bent sharply at acute angles to stably support the human body. By distributing the weight of the human body over the passive upper body support assemblies 401, the total amount of load carried by the knees and the severity of the pose required to stably support the human body are significantly reduced.

In general, an upper body support system 400 may employ any number of passive upper body support assemblies. In addition, the upper body support system 400 may be located in any suitable location with respect to the human torso. However, it is preferable to locate the upper body support system 400 in a location that stably supports the human body weight, while minimizing the weight supported by other members of the human body, such as the knees or feet.

An upper body support system includes one or more passive, upper body support assemblies coupled to a harness removeably attached to the torso of a human user. Each upper body support assembly includes one or more rotational joints with braking capability and an extensible body support limb extending toward the working environment with locking capability.

Figure 2:
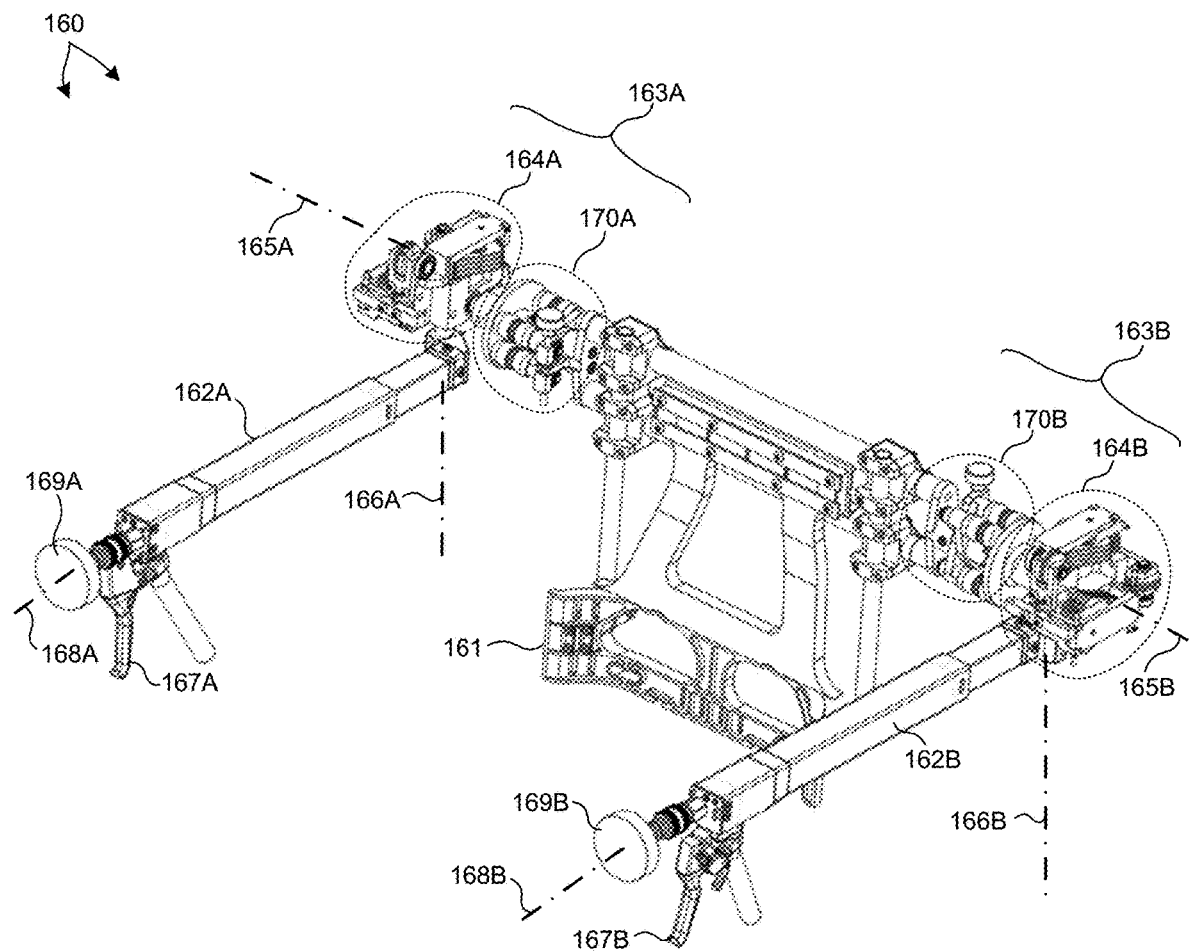
FIG. 2 is a diagram illustrative of an upper body support system 160 in another embodiment.

FIG. 2 is a diagram illustrative of an upper body support system 160 in another embodiment. Upper body support system 160 includes a harness assembly 161 and two passive upper body support assemblies including shoulder joints 163A-B and extensible body support limbs 162A-B, respectively. Harness assembly 161 includes a vest (not shown) tailored to fit the human user. A human user dons the vest in a conventional manner and cinches the vest onto his/her body using locking mechanisms (e.g., buckles, cinch straps, etc.).

The passive upper body support assemblies are each coupled to harness assembly 161. Each of the shoulder joints 163A-B of each respective upper body support assembly include a compliant mechanical joint 170A-B and a two degree of freedom mechanical shoulder joint and brake device 164A-B. Compliant mechanical joints 170A-B are coupled to harness assembly 161. Compliant mechanical joints 170A-B rotate about rotation axes orthogonal to axes 165A-B, respectively, with an adjustable compliance (i.e., inverse of stiffness). Mechanical shoulder joint and brake devices 164A-B are coupled to compliant mechanical joints 170A-B, respectively. Extensible body support limb 162A rotates about a rotational joint axis 165A and a rotational joint axis 166A of mechanical shoulder joint and brake device 164A. Similarly, extensible body support limb 162A rotates about a rotational joint axis 165B and a rotational joint axis 166B of mechanical shoulder joint and brake device 164B. In addition, the nominal length of each of the extensible body support limbs 162A-B is adjustable. As depicted in FIG. 2, the length of extensible body support limb 162A is adjusted along extension axis 168A, and the length of extensible body support limb 162B is adjusted along extension axis 168B. By rotation about rotational joint axes 165A and 166A, and translation along extension axis 168A, the position of the end-effector 169A with respect to harness assembly 161 may be located arbitrarily in three dimensions. Similarly, by rotation about rotational joint axes 165B and 166B, and translation along extension axis 168B, the position of the end-effector 169B with respect to harness assembly 161 may be located arbitrarily in three dimensions.

Although FIG. 2 depicts compliant mechanical joints 170A-B coupled to harness assembly 161, in some other embodiments, mechanical shoulder joint and brake devices 164A-B are coupled to harness assembly 161, and compliant mechanical joints 170A-B are coupled to extensible body support limb 162A-B, respectively. In these embodiments, compliant mechanical joints 170A-B rotate about rotation axes orthogonal to axes 168A-B, respectively, with an adjustable compliance (i.e., inverse of stiffness).

In one aspect, the end-effector of each body support limb can be positioned and fixed in three degrees of freedom over a relatively large workspace by controlling braking of two rotational joints and controlling locking of a linear joint. In these embodiments, a convenient user interface allows a human user to place a hand on a handle of the body support limb and control the position of the end-effector of the body support limb with respect to the harness from the handle. At the handle, the human user operates a brake control lever to alternately apply and release the brakes of two rotational joints and a limb lock control lever to alternately lock and unlock the linear joint. When the brakes are released, the linear joint is unlocked, or both, the human user can reposition the body support limb by freely moving the body support limb with respect to the harness. When the desired position is reached, the human user applies the brakes, locks the linear joint, or both, to fix the position of the body support limb with respect to the harness. The forces required to operate the brake control lever and to operate the limb lock control lever are low enough for a human user to easily operate in a passive manner. Similarly, the forces required to reposition the body support limb when the brakes are released, the linear joint is unlocked, or both, are low enough for a human user to easily maneuver in a passive manner.

Figure 3:
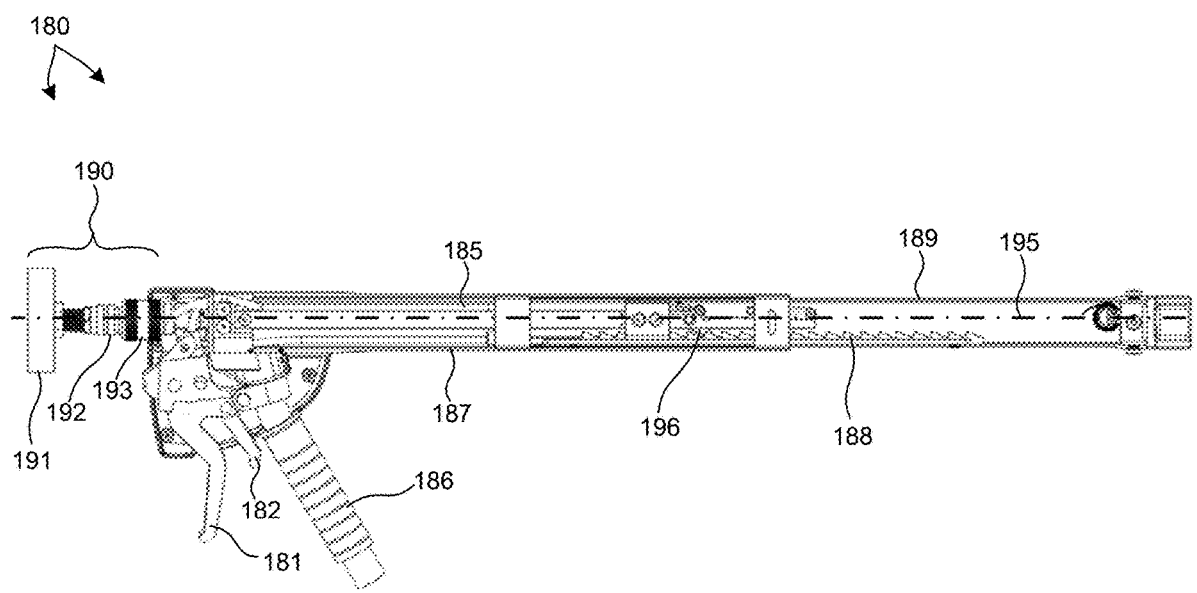
FIG. 3 is a diagram illustrative of an extensible body support limb assembly 180 in one embodiment.

FIG. 3 depicts an extensible body support limb assembly 180 in one embodiment. As depicted in FIG. 3, extensible body support limb assembly 180 includes an upper limb assembly including an upper limb structure 189 and upper limb lock structure 188, and a lower limb assembly including lower limb structure 187, handle 186, lower limb lock structure 189, limb lock control device 182, and brake control device 181. Upper limb structure 189 is coupled to a mechanical shoulder joint and brake device (as depicted in FIG. 2). Lower limb structure 187 is coupled to an end-effector assembly 190.

Upper limb lock structure 188 is coupled to upper limb structure 189. In the embodiment depicted in FIG. 3, upper limb lock structure 188 is a rack including a number of teeth. Lower limb structure 187 slides over upper limb structure 189 to form a prismatic joint (i.e., linear joint) having a degree of freedom along linear axis 195. Lower limb lock structure 189 is coupled to lower limb structure 187. In the embodiment depicted in FIG. 3, lower limb lock structure 187 is a pawl. The upper and lower limb lock structures are coupled together in a controlled manner in one of two states. In a first state, the locked state, the pawl 189 is engaged with the rack 188 to lock the lower limb structure to the upper limb structure such they cannot move relative to one another along linear axis 195. In a second state, the unlocked state, the pawl 189 is disengaged from the rack 188, which leaves the lower limb structure 187 free to move relative to the upper limb structure 188 along linear axis 195.

Handle 186 is coupled to lower limb structure 187. Handle 186 provides a convenient position to rest a hand of a human user. From this position a human user can control the state of the shaft brake assemblies of a mechanical joint and brake device using brake control lever 181, the state of upper and lower limb lock structures using limb lock control lever 182, and the three dimensional position of end-effector assembly 190 with respect to a harness assembly without the hand of the human user having to leave handle 186.

Figure 4:
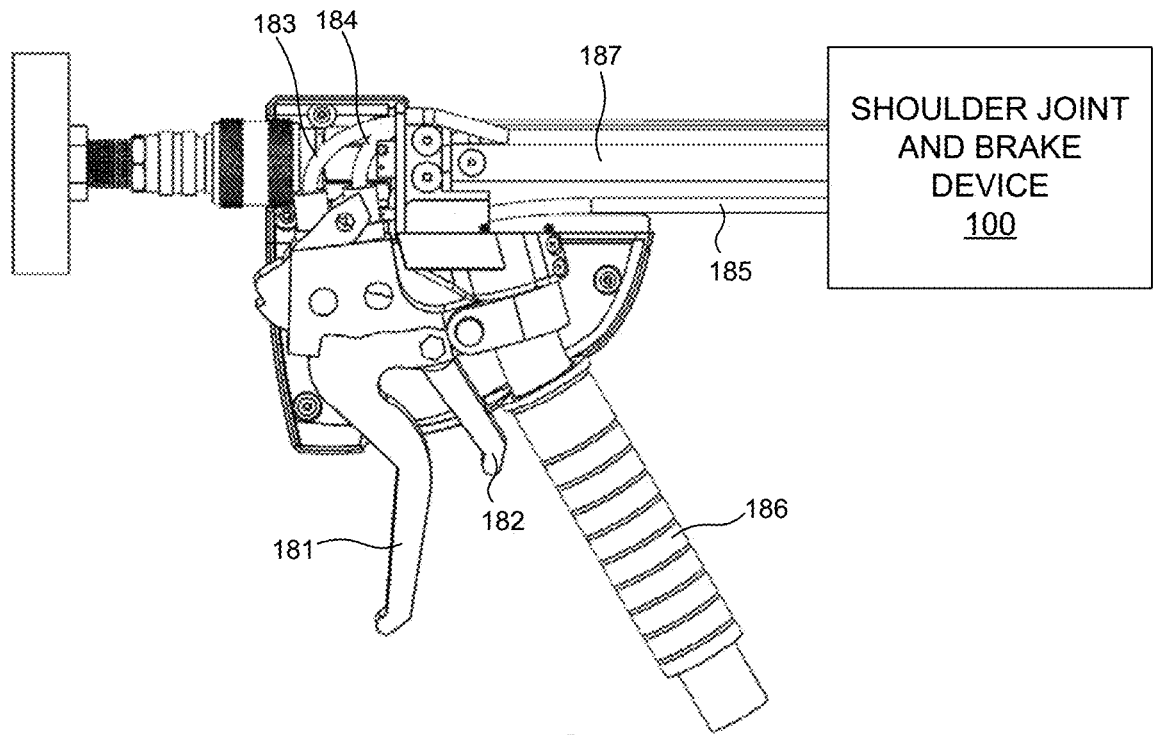
FIG. 4 depicts another diagram illustration of extensible body support limb assembly 180 depicted in FIG. 3.

FIG. 4 depicts another illustration of extensible body support limb assembly 180 depicted in FIG. 3. As depicted in FIG. 4, brake control lever 181 displaces both a cable inside of sheath 183 and a cable inside sheath 184. The displacement of these cables controls the braking torque applied to each rotational joint of shoulder joint and brake device 100, respectively. More specifically, as the human user pulls on brake control lever 181, the braking torques on both rotational axes of shoulder joint and brake device 100 are reduced, practically to zero. When the human user releases brake control lever 181, the braking torques on both rotational axes of shoulder joint and brake device 100 return to maximum torque. In addition, limb lock control lever 182 displaces a cable inside of sheath 185. The displacement of this cable controls the position of pawl 196 with respect to rack 188. As the human user pulls on limb lock control lever 182, pawl 196 pivots about pin 197 (depicted in FIG. 7) and releases from rack 188. In this state, the lower limb structure 187 is free to move relative to the upper limb structure 188 along linear axis 195. As the human user releases limb lock control lever 182, pawl 196 pivots the opposite direction about pin 197 and engages rack 188. In this state, the lower limb structure 187 is locked to the upper limb structure 188.

Figure 5:
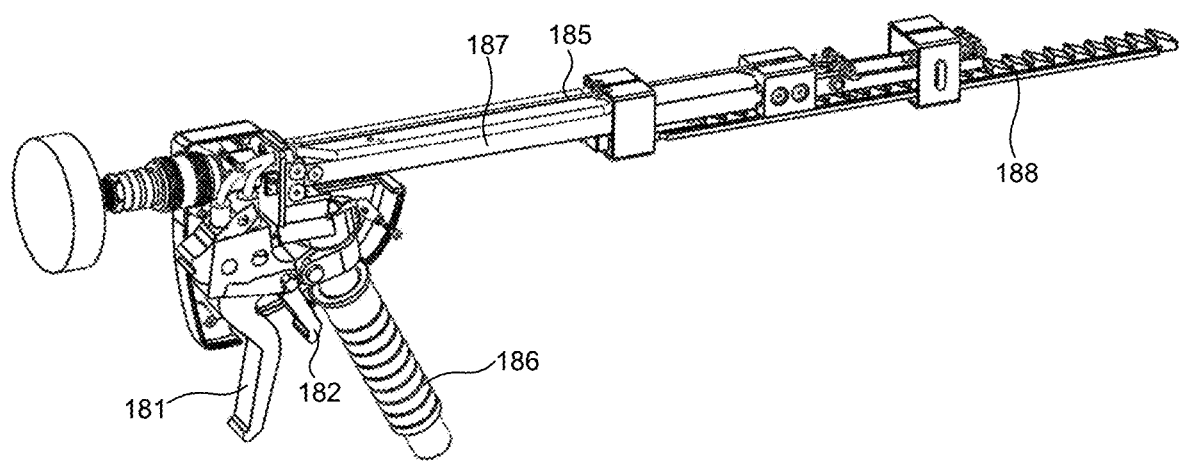
FIG. 5 depicts yet another diagram illustration of extensible body support limb assembly 180 depicted in FIG. 3.
Figure 6:
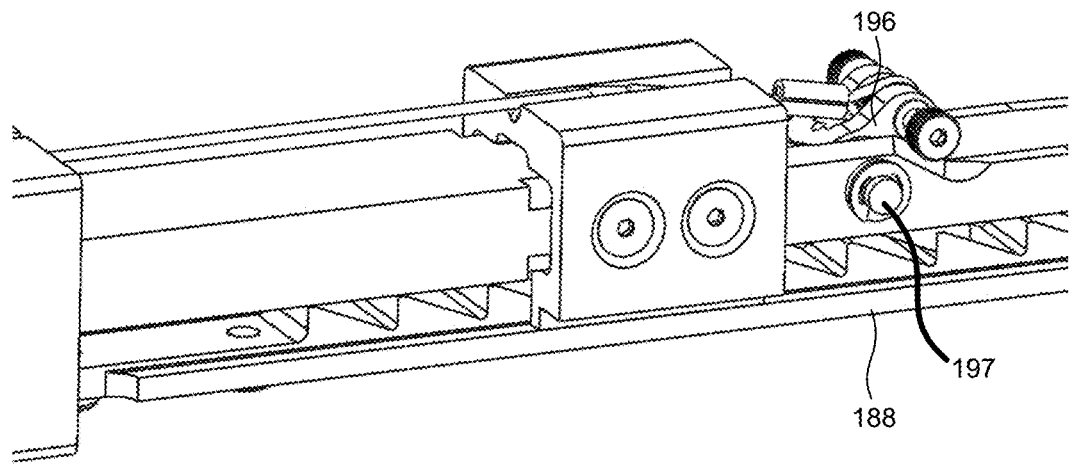
FIG. 6 depicts yet another diagram illustration of extensible body support limb assembly 180 depicted in FIG. 3.
Figure 7:
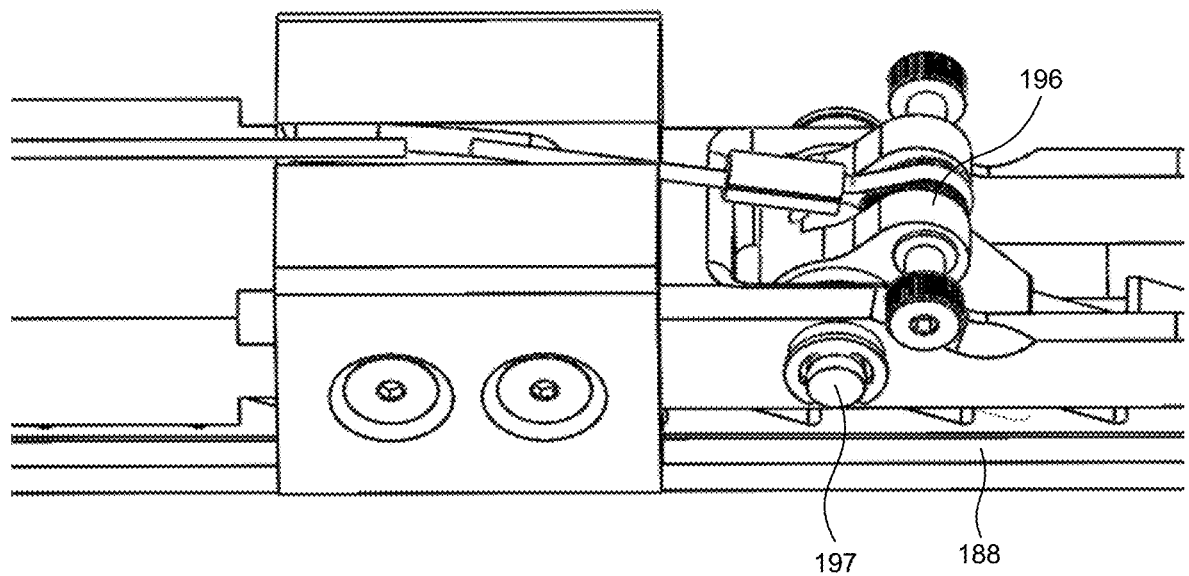
FIG. 7 depicts yet another diagram illustration of extensible body support limb assembly 180 depicted in FIG. 3.

FIGS. 5-7 depict additional illustrations of extensible body support limb assembly 180 depicted in FIG. 3.

In another aspect, an end-effector is removeably attached to each body support limb with a quick-change coupler. In this manner, a human user can select the most effective style of end effector to suit a particular task environment and the type of body support required to perform a task. The force required to operate the quick-change coupler is low enough for a human user to passively attach/detach the end-effector without the use of an additional tool. In some embodiments, a swivel joint mechanism is included between the quick-change coupler and the end-effector to compensate for misalignment, allowing a ground facing surface of the end-effector to fully contact the task environment.

Figure 8:
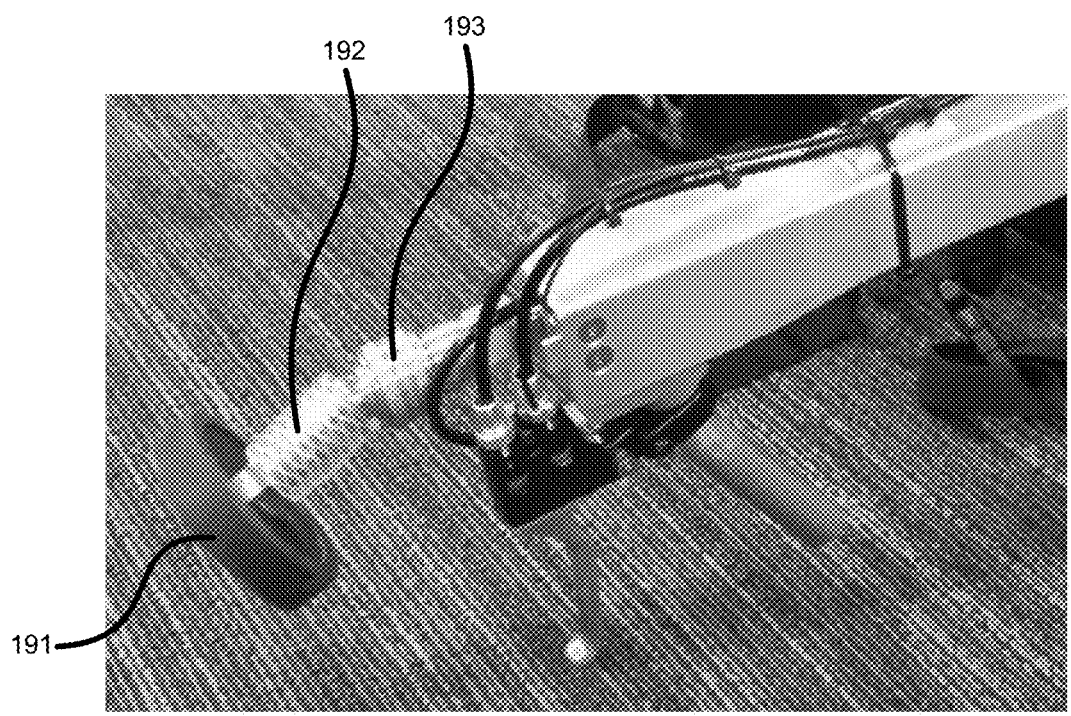
FIG. 8 depicts an end-effector assembly including a quick-change coupler, a swivel mechanism, and an end-effector.

FIG. 8 depicts an end-effector assembly including a quick-change coupler 193, a swivel mechanism 192, and an end-effector 191. As depicted in FIG. 8, the end-effector assembly is removable from the lower limb structure by actuation of quick-change coupler 193 by the hand of a human user without the use of tools.

Swivel mechanism 192 includes constrains all degrees of freedom of movement of end-effector 191 with respect to the lower limb structure except one or more rotational degrees of freedom. This allows end-effector 191 to pivot with respect to the lower limb structure such that a surface of end-effector 191 can make contact with the work environment over a maximum surface area.

Figure 9:
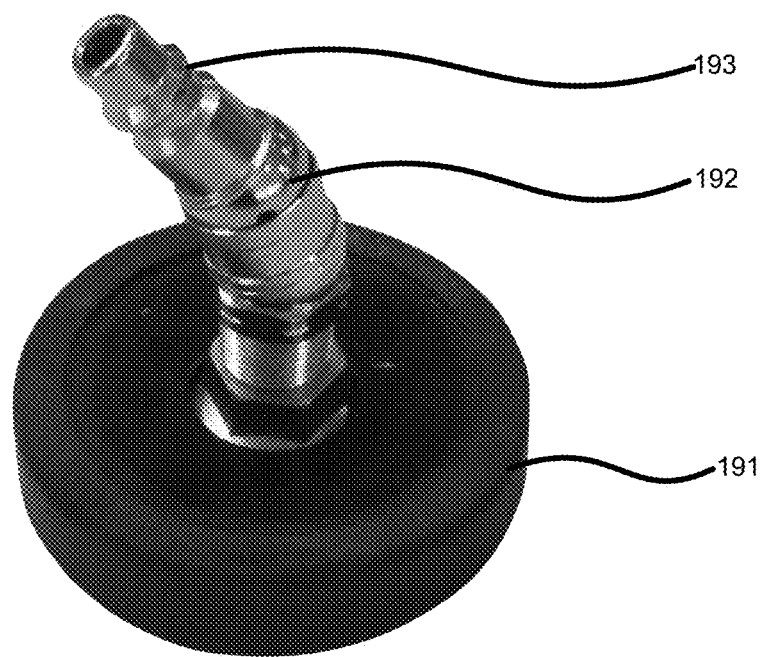
FIG. 9 depicts another illustration of an end-effector assembly including a quick-change coupler, a swivel mechanism, and an end-effector.

FIG. 9 depicts another illustration of an end-effector assembly including a quick-change coupler 193, a swivel mechanism 192, and an end-effector 191.

Figure 10:
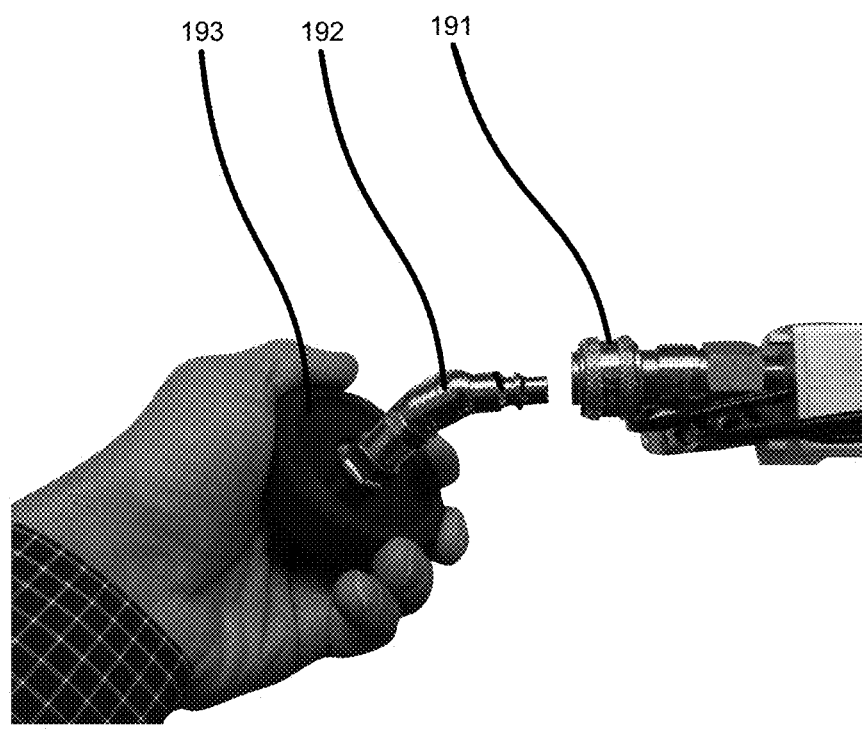
FIG. 10 depicts yet another illustration of an end-effector assembly including a quick-change coupler, a swivel mechanism, and an end-effector.

FIG. 10 depicts yet another illustration of an end-effector assembly including a quick-change coupler 193, a swivel mechanism 192, and an end-effector 191. As depicted in FIG. 10, a portion of the quick-change coupler mechanism is attached to a lower limb structure and a mating portion of the quick-change coupler mechanism is attached to the swivel mechanism 192.

In some embodiments, a swivel mechanism is integrated with a quick-change coupler such that the quick-change coupler itself constrains all degrees of freedom of movement of end-effector 191 with respect to the lower limb structure except one or more rotational degrees of freedom.

The end-effector 191 may be any suitable structure or mechanism. In some embodiments, end-effector 191 is spike shaped such that the end-effector digs into the media of the work environment to effectively support the upper body support system. In some embodiments, end-effector 191 is a puck shaped structure fabricated from a material with a high coefficient of friction (e.g., rubber).

Figure 11:
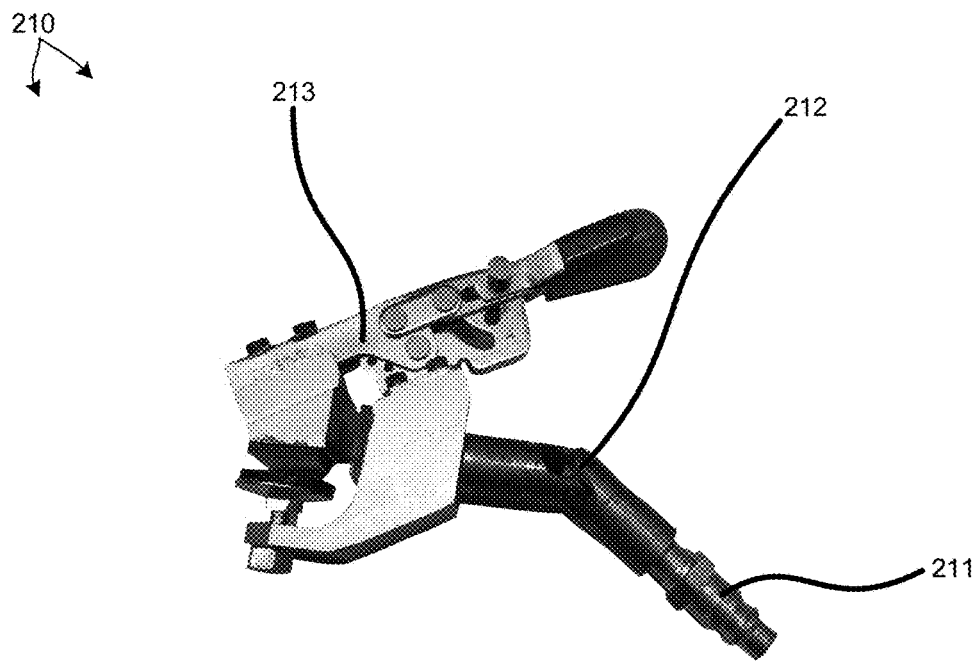
FIG. 11 depicts an illustration of an end-effector assembly including a quick-change coupler, a swivel mechanism, and a mechanical clamp end-effector.

In some embodiments, the end-effector includes a clamping mechanism removeably attached to a structure in the working environment. FIG. 11 depicts an end-effector assembly 210 including a quick-change coupler 211, a swivel mechanism 212, and a mechanical clamp end-effector 213.

Figure 12:
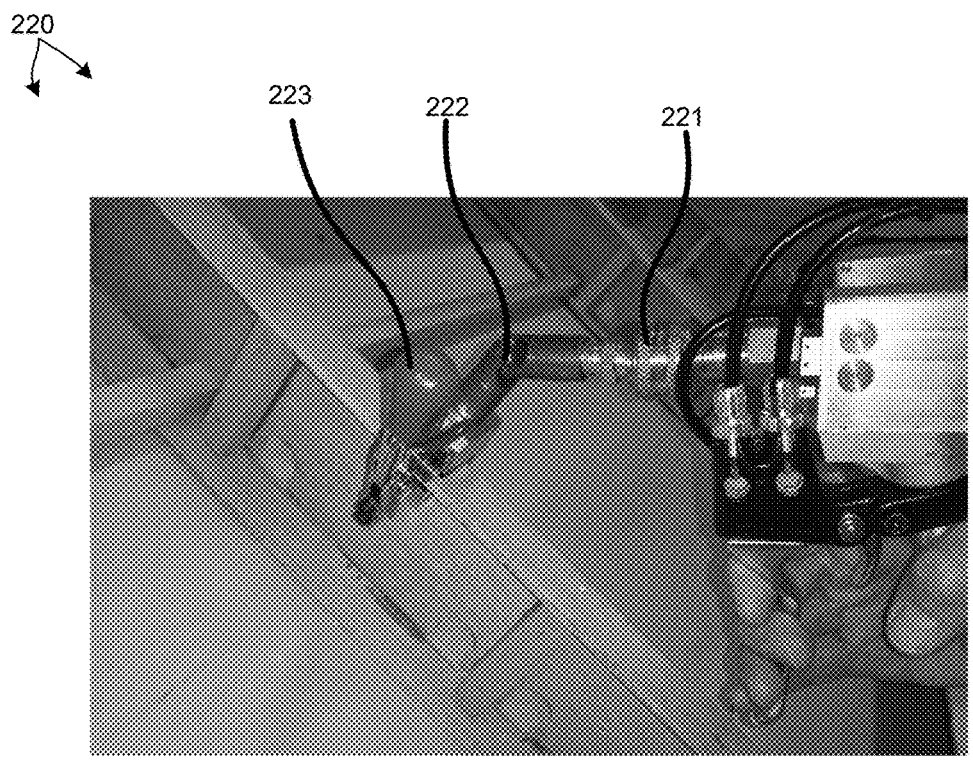
FIG. 12 depicts another illustration of an end-effector assembly including a quick-change coupler, a swivel mechanism, and a mechanical clamp end-effector.

FIG. 12 depicts an end-effector assembly 220 including a quick-change coupler 221, a swivel mechanism 222, and a mechanical clamp end-effector 223. In the embodiment depicted in FIG. 12, mechanical clamp 223 is manually attached to the working environment by the human user. This can be done either before or after the human user engages the quick-change coupler 221.

Figure 13:
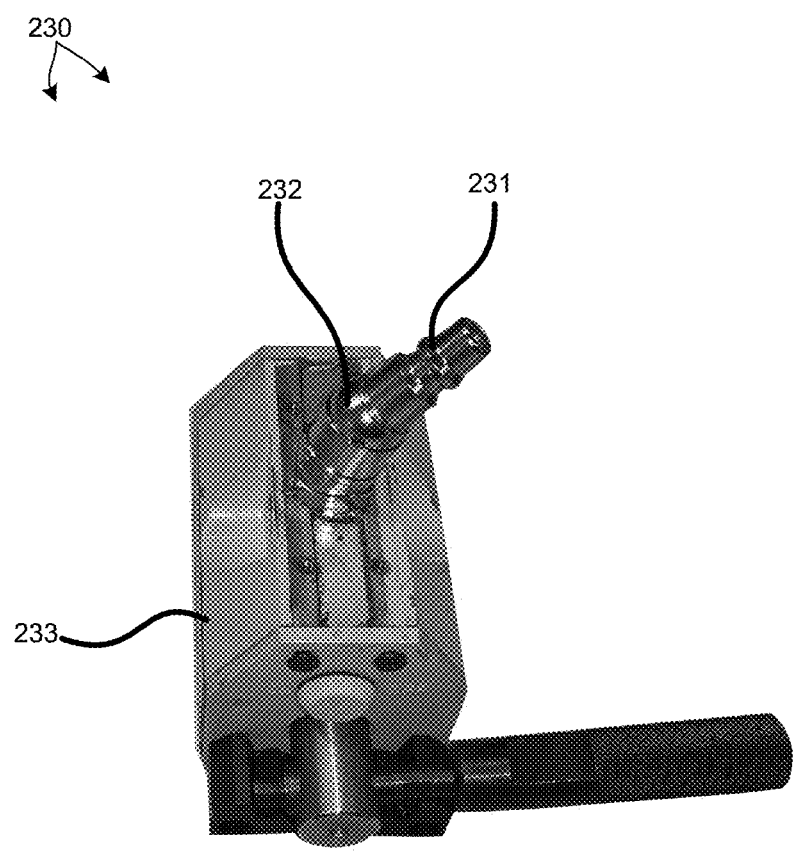
FIG. 13 depicts an illustration of an end-effector assembly including a quick-change coupler, a swivel mechanism, and a magnetic clamp end-effector.

FIG. 13 depicts an end-effector assembly 230 including a quick-change coupler 231, a swivel mechanism 232, and a magnetic clamp end-effector 233. A magnetic clamp is suitable when ferrous materials are present in the work environment.

A mechanical shoulder joint and brake device is disposed in each structural path between the harness assembly and a surface of a working environment. The mechanical shoulder joint and brake device allows the extensible body support limb to freely rotate with respect to the frame in at least one degree of freedom when a human user releases the brake force to adjust the position of the upper body support assembly. In this manner the human user can move the upper body freely to change posture. When the human user finds a suitable position, the human user allows the spring element to reapply the brake force and hold the position of the upper body support assembly. In general, the braking force applied by the spring element is adjustable to accommodate the preferences and working conditions of the human user.

In some embodiments, a robotic structure includes a lightweight rotational joint having passive, high torque braking in two degrees of freedom to emulate a shoulder joint. Each degree of freedom includes a shaft with high torque braking. A spring element preloads the braking assembly to maintain high torque braking of the shaft. The tensile force applied by the spring is multiplied to a much larger force applied to the braking elements. The tensile force applied by the spring is multiplied by an eccentric mechanism. The force generated by the eccentric mechanism is, in turn, multiplied by a lever mechanism to apply a large braking force to the braking elements. In addition, a human user is able to manually displace the spring element and effectively relieve the braking torque. Thus, a human use is able to manually release the preload of the braking assembly, allowing the shaft to rotate freely, or with reduced resistance.

Figure 14:
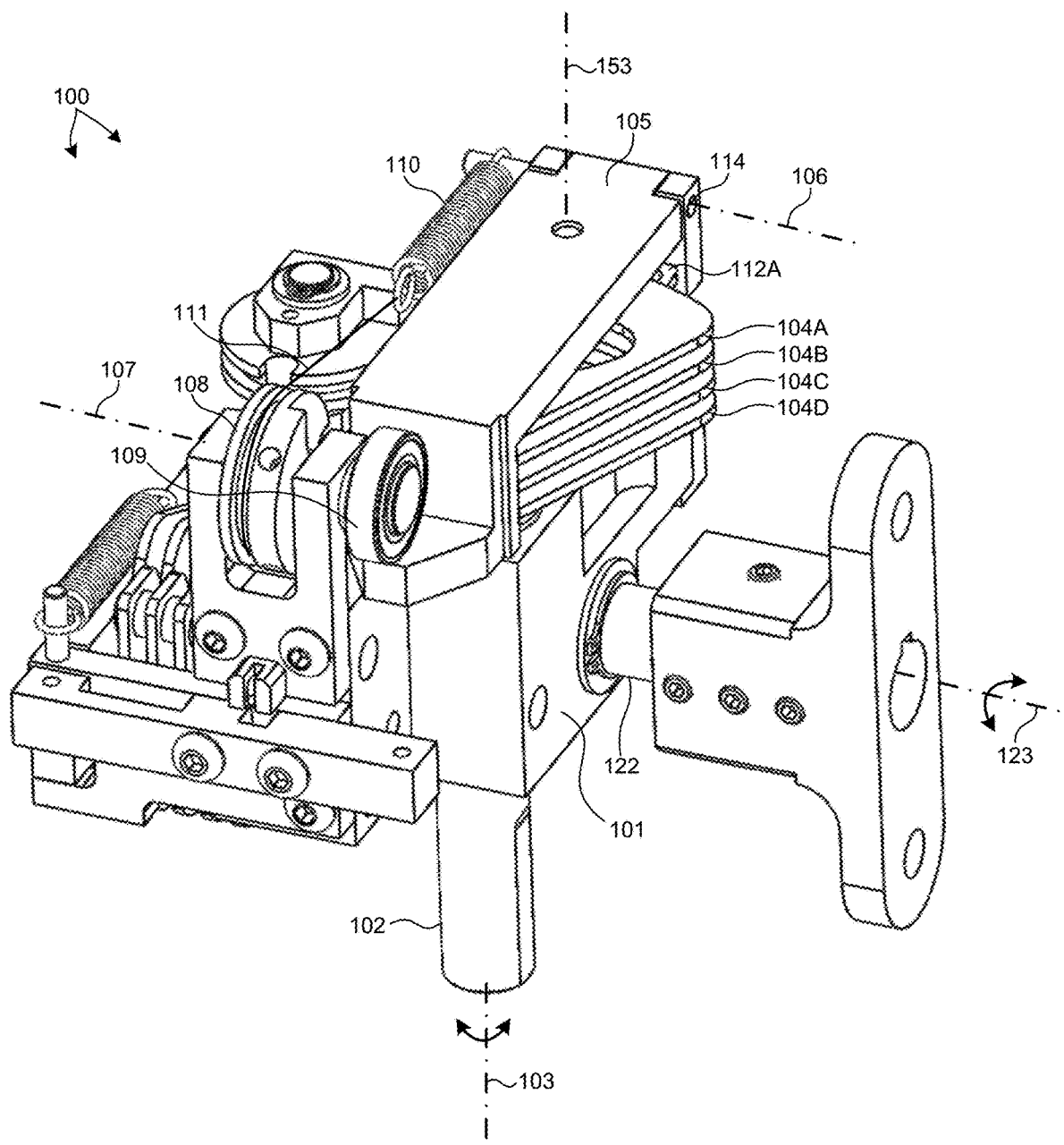
FIG. 14 is a diagram illustrative of a two degree of freedom mechanical shoulder joint and brake device 100 in one embodiment.

FIG. 14 is a diagram illustrative of a two degree of freedom mechanical shoulder joint and brake device 100 in one embodiment. Mechanical shoulder joint and brake device 100 includes a shoulder joint frame 101, mechanical shaft 102, and mechanical shaft 122. Mechanical shaft 102 rotates with respect to shoulder joint frame 101 about rotational axis 103. The remaining degrees of freedom of mechanical shaft 102 are constrained with respect to shoulder joint frame 101. Similarly, mechanical shaft 122 rotates with respect to shoulder joint frame 101 about rotational axis 123. The remaining degrees of freedom of mechanical shaft 122 are also constrained with respect to shoulder joint frame 101. In the embodiment depicted in FIG. 14, rotational axes 103 and 123 are orthogonal. However, in general, rotational axes 102 and 123 may be oriented with respect to one another at any suitable angle. In addition, although mechanical shoulder joint and brake device 100 includes two degrees of freedom, in general, a mechanical shoulder joint and brake device as described herein may in include any number of degrees of freedom, including one degree of freedom.

Figure 15:
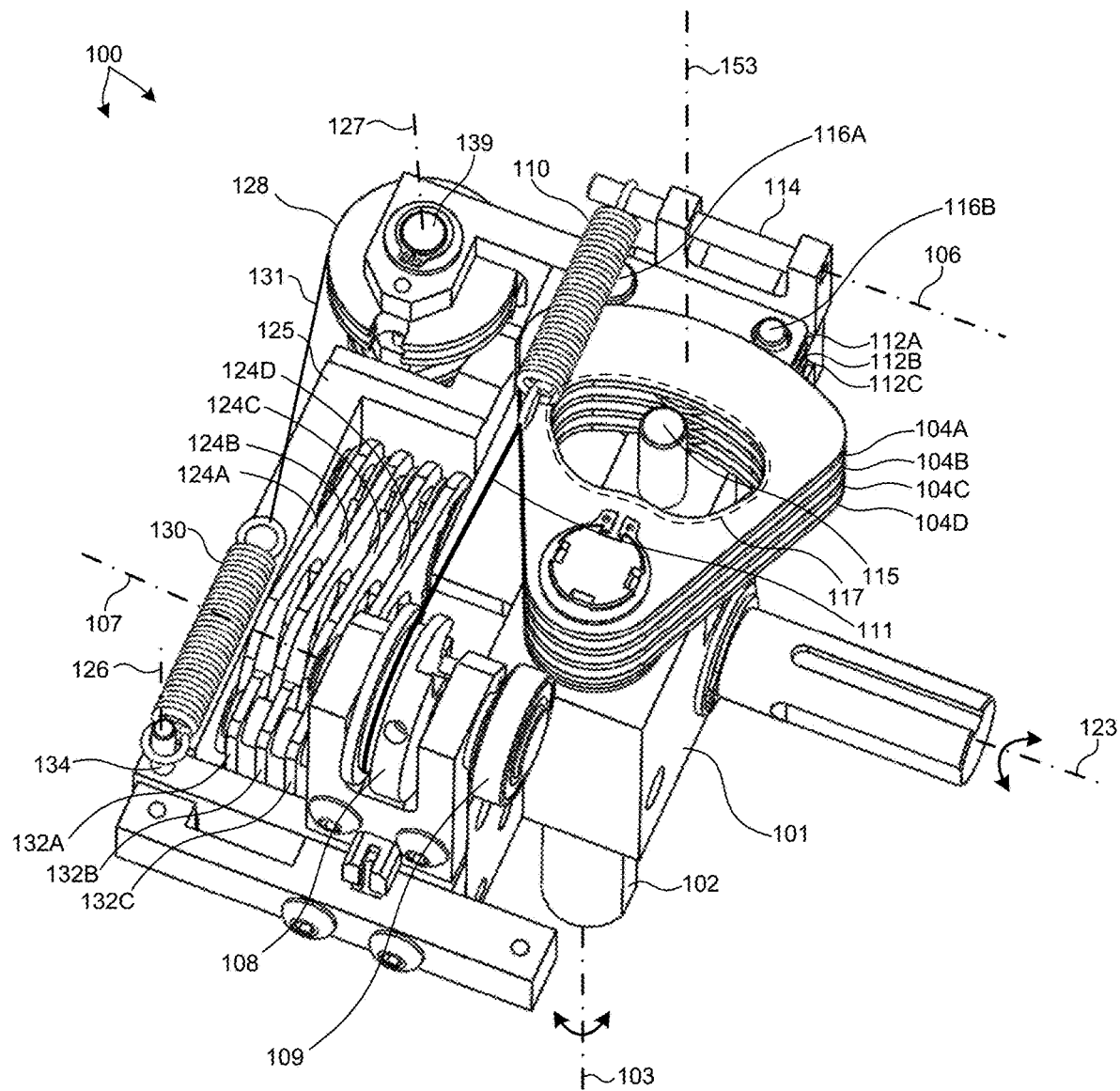
FIG. 15 is a diagram illustrative of a cutaway view of the two degree of freedom mechanical shoulder joint and brake device 100.

As depicted in FIGS. 14-19, a set of brake plates 104A-D are fixedly attached to shaft 102. Another set of brake plates 112A-C are interleaved with brake plates 104A-D. Together the interleaved sets of brake plates 104A-D and 112A-C comprise a brake assembly stack. Brake plates 112A-C are constrained by pins 116A and 116B to translate in one direction along a braking axis 153. In the embodiment depicted in FIGS. 14 and 15, braking axis 153 is parallel to rotational axis 103. Lever structure 105 is pinned to shoulder joint frame 101 by pin 106. In this manner, pin 114 constrains lever 105 to rotate about clamping axis 106. A brake force actuator mechanism is also attached to shoulder joint frame 101. The brake force actuator mechanism applies force to lever 105, which, in turn, applies force to the brake stack assembly. As depicted in FIGS. 14 and 15, clamping axis 106 is orthogonal to braking axis 153.

Figure 17:
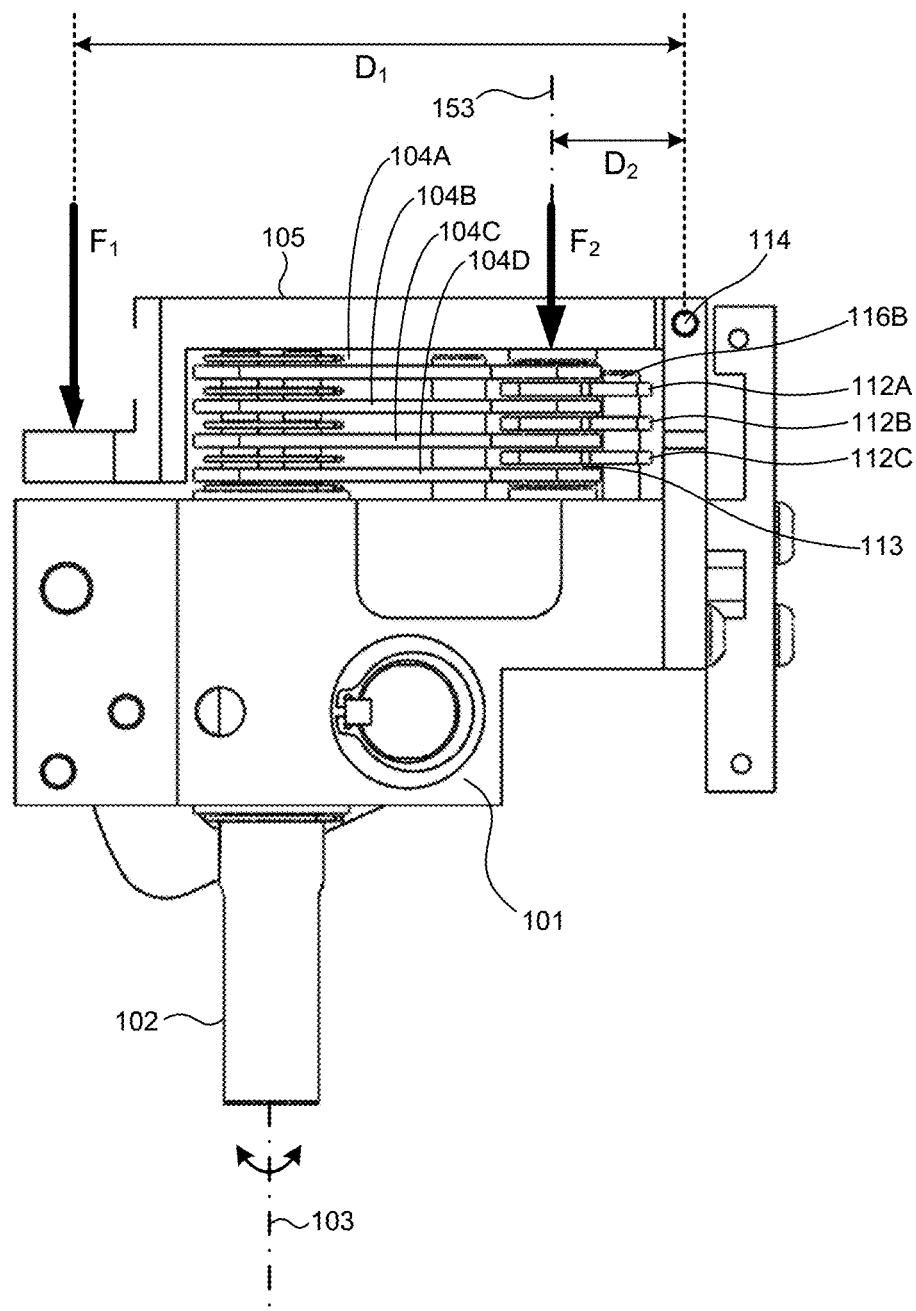
FIG. 17 is a diagram illustrative of a side view of the two degree of freedom mechanical shoulder joint and brake device 100.

FIG. 17 depicts a side view of mechanical shoulder joint and brake device 100 illustrating braking force multiplication by lever structure 105. As depicted in FIG. 17, a brake force actuator mechanism applies a force, $F_1$, to lever structure 105. This force is applied at a distance, $D_1$, from clamping axis 106. The force, $F_1$, applied to lever structure 105, induces a force, $F_2$, along the braking axis 153, which is located a distance, $D_2$, from clamping axis 106. In this manner, lever structure 105 is a force multiplier as described by equation (1).

$$\frac{F_2}{F_1} = \frac{D_1}{D_2} \qquad (1)$$

Figure 18:
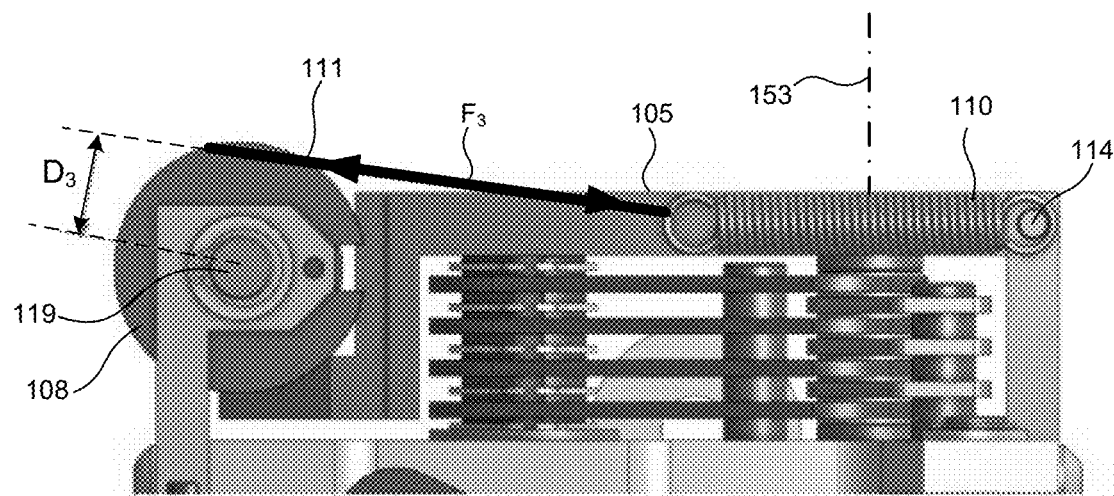
FIG. 18 is a diagram illustrative of another side view of the two degree of freedom mechanical shoulder joint and brake device 100.
Figure 19:
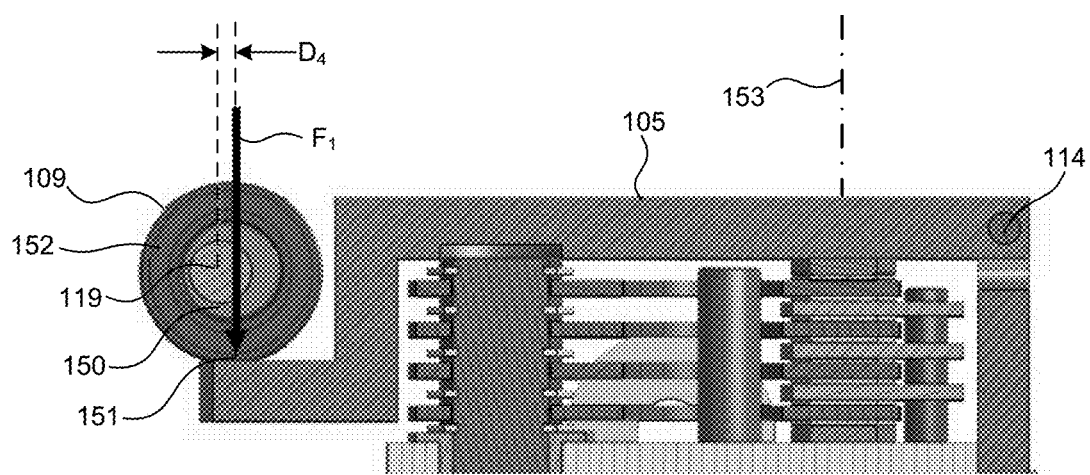
FIG. 19 is a diagram illustrative of yet another side view of the two degree of freedom mechanical shoulder joint and brake device 100.

FIGS. 14, 18, and 19 also depict elements of the brake force actuator mechanism including a spring element 110, cable 111, pulley 108, shaft 119, and eccentric wheel 109. As depicted in FIGS. 14, 18, and 19, one end of spring element 110 is coupled to shoulder joint frame 101 and the opposite end is coupled to cable 111. Spring element 110 is placed in tension, and thus applies a tensile force, $F_3$, at the perimeter of pulley 108 via cable 111. Pulley 108 is attached to shaft 119, along with eccentric mechanism 109. In this manner, the shaft assembly, including pulley 108, shaft 119, and eccentric mechanism 109, is constrained to rotate with respect to the shoulder joint frame about brake force actuator axis 107. In the embodiments depicted in FIGS. 14, 18, and 19, the brake force actuator axis 107 is parallel to clamping axis 106. The perimeter of eccentric mechanism 109 is in contact with lever 105 at contact area 151. As depicted in FIG. 19, the eccentric mechanism applies contact force, $F_1$, to lever 105 over contact area 151.

As depicted in FIG. 19, eccentric mechanism 109 includes a bearing 152 pressed onto an eccentric spacer 150, which is, in turn, pressed onto shaft 119. As depicted in FIG. 19, the center of the hole of eccentric spacer 150 fixed to shaft 119 is misaligned from the center of the perimeter of eccentric spacer 150 fixed to bearing 152 by a distance $D_4$. In this manner, a rotation of shaft 119 induces a translation at contact area 151 in a direction parallel to braking axis 153. In other embodiments, an eccentric shaft (e.g., camshaft) may be employed as eccentric mechanism 109. In other embodiments, an eccentric wheel pressed onto shaft 119 is employed as eccentric mechanism 109. In general, any suitable mechanism to translate rotation of shaft 119 into a translational displacement of lever 105 at contact area 151 may be contemplated within the scope of this patent document.

As depicted in FIGS. 18 and 19, the tensile force, $F_3$, applied to pulley 108, induces a torque about shaft 119, which, absent motion, is counterbalanced by the torque induced by the reaction force, $F_1$ acting at a distance, $D_4$/from axis 107, e.g., the center of shaft 119. In this manner, the brake force actuator mechanism is a force multiplier as described by equation (2).

$$\frac{F_1}{F_3} = \frac{D_3}{D_4} \quad (2)$$

Combining the force multiplier effects of both lever structure 105 and the brake force actuator mechanism, the total force multiplication from force, $F_3$, applied by spring 110 to braking force, $F_2$, applied along brake axis 153 is described by equation (3).

$$\frac{F_2}{F_3} = \left(\frac{D_1}{D_2}\right)\left(\frac{D_3}{D_4}\right) \quad (3)$$

Also depicted in FIGS. 14 and 15, a set of brake plates 124A-D are fixedly attached to shaft 122. Another set of brake plates 132A-C are interleaved with brake plates 124A-D. Together the interleaved sets of brake plates 124A-D and 132A-C comprise a brake assembly stack. Lever structure 125 is pinned to shoulder joint frame 101 by pin 134. In this manner, pin 134 constrains lever 125 to rotate about clamping axis 126. A brake force actuator mechanism including shaft 139, pulley 128, cable 131, and spring 130 is also attached to shoulder joint frame 101. The brake force actuator mechanism applies force to lever 125 as described hereinbefore.

As described hereinbefore, the braking force, $F_2$, applied to the braking system by spring 110 is multiplied by lever structure 105 and brake force actuator mechanism. In a further aspect, the braking force, $F_2$, applied by spring 110 is manually reduced or released to a zero value by a human user.

FIG. 14 depicts cable 111 attached to pulley 108. However, in addition, cable 111 extends into a sheath that itself extends to a manual brake control lever (e.g., manual brake control lever 167A depicted in FIG. 2). In this manner, a human user can displace cable 111, which deforms spring element 110 and releases the braking force, $F_2$.

In another aspect, each degree of freedom of the mechanical shoulder joint and brake device includes a stopper structure to limit the range of rotation of a particular rotational joint. In the embodiment depicted in FIG. 15, a stopper pin 115 is coupled to shoulder joint frame 101. Stopper pin 115 extends through an aperture (i.e., opening) in one or more of brake plates 104A-D. At the limits of the workspace of rotational shaft 102, stopper pin 115 makes contact with one or more of brake plates 104A-D, and stops further motion in one direction. At the opposite end of the workspace, stopper pin 115 makes contact with one or more of brake plates 104A-D, and stops further motion in the opposite direction.

In another aspect, a friction enhancing material is bonded to one or more of the brake plates to increase the braking torque induced at each rotational joint for a given brake force.

Specific embodiments are presented herein by way of non-limiting example. In general, many different designs may be employed to achieve the functionality described herein. In one example, the number of interleaved brake plates may be any suitable integer number. In general, as the number of brake plate is increased, the braking torque induced at each rotational joint is increased for a given brake force.

Figure 16:
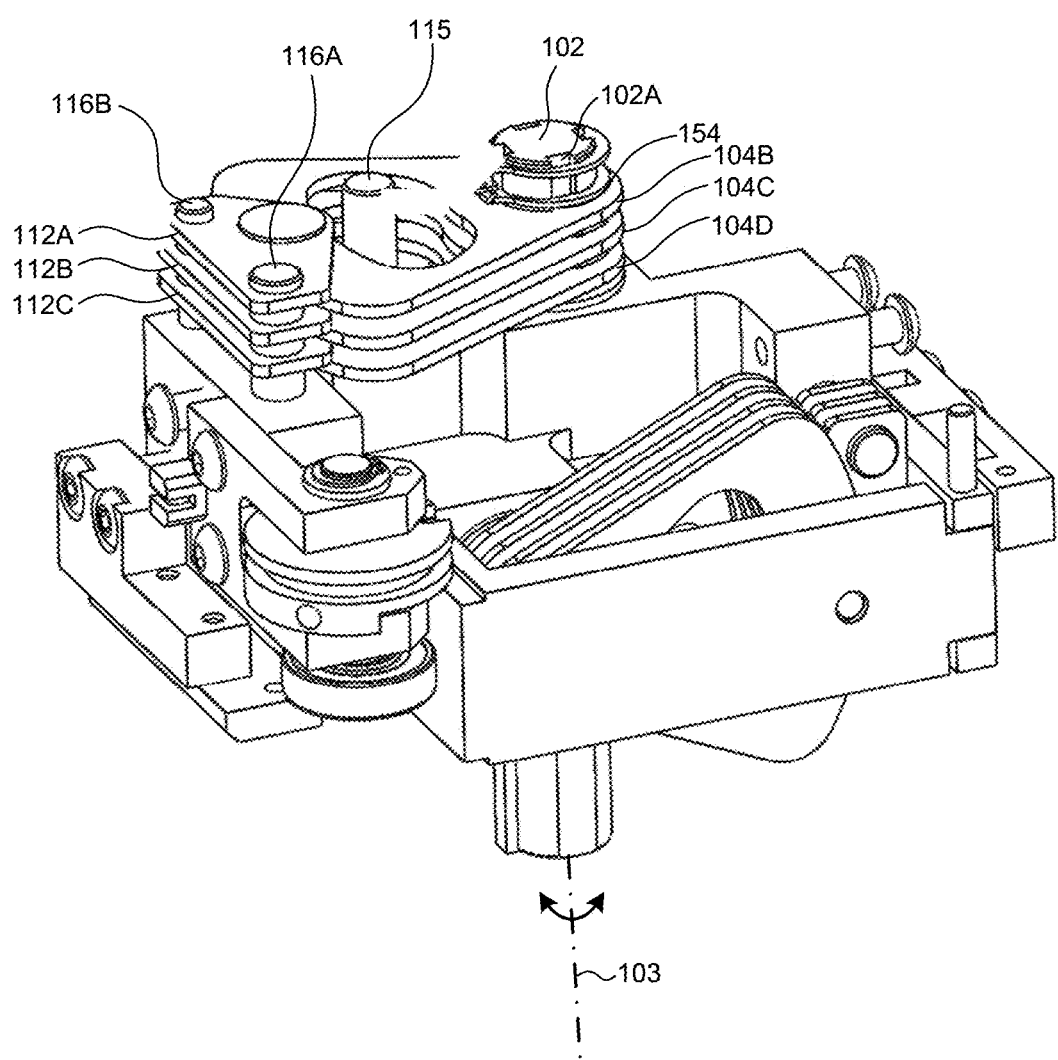
FIG. 16 is a diagram illustrative of another cutaway view of the two degree of freedom mechanical shoulder joint and brake device 100.

In general, brake plates, such as brake plates 104A-D may be attached to shaft structure 102 in any suitable manner. As depicted in FIG. 16, shaft 102 includes four keyways (e.g., keyway 102A) that run along the shaft in the axial direction. Each brake plate includes a corresponding tab (e.g., tab 154) that fits into a keyway (e.g., keyway 102A) and effectively constrains each brake plate to rotate with shaft 102. Other fitment approaches, such as splines, weldment, press fit, etc., may also be contemplated within the scope of this patent document.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An upper body support system, comprising:
   a harness assembly configured to be removably attached to a torso of a human user;

a plurality of passive upper body support assemblies each coupled to the harness assembly, wherein a first of the plurality of passive upper body support assemblies is configured to be coupled to the harness assembly on a first side of the torso of the human user, and wherein a second of the plurality of passive upper body support assemblies is configured to be coupled to the harness assembly on a second side of the torso of the human user opposite the first side, wherein each of the plurality of passive upper body support assemblies includes:
an extensible body support limb assembly extending toward a surface of a working environment, the extensible body support limb assembly including:
an upper limb assembly including an upper limb structure and one or more upper limb lock structures; and
a lower limb assembly including:
a lower limb structure configured to move linearly with respect to the upper limb structure along a limb extension axis;
a handle coupled to the lower limb structure such that a hand of the human user can be positioned to grip the lower limb structure,
one or more lower limb lock structures coupled to the lower limb structure, and
a limb lock control device accessible by a hand of the human user positioned on the handle, wherein a first position of the limb lock control device engages the one or more upper limb lock structures with the one or more lower limb lock structures and fixes a position of the upper limb structure with respect to the lower limb structure along the extension axis, and wherein a second position of the limb lock control device disengages the one or more upper limb lock structures from the one or more lower limb lock structures and frees the lower limb structure to move linearly with respect to the upper limb structure along the extension axis.

2. The upper body support system of claim 1, each passive upper body support assembly, further comprising:
a shoulder joint and brake device coupled between the harness assembly and the extensible body support limb assembly and constraining the extensible body support limb to rotate with respect to the harness assembly about one or more joint axes, the shoulder joint and brake device including one or more shaft brake assemblies each configured to fix an orientation of the extensible body support limb assembly with respect to the harness assembly in an engaged configuration and to free the extensible body support limb assembly to rotate with respect to the harness assembly about the one or more joint axes in a disengaged configuration.

3. The upper body support system of claim 1, each lower limb assembly, further comprising:
a brake control device accessible by a hand of the human user positioned on the handle, wherein a first position of the brake control device engages the one or more shaft brake assemblies causing the one or more shaft brake assemblies to fix an orientation of the extensible body support limb assembly with respect to the harness assembly, and wherein a second position of the brake control device disengages the one or more shaft brake assemblies to free the extensible body support limb assembly to rotate with respect to the harness assembly about the one or more joint axes.

4. The upper body support system of claim 1, wherein the one or more lower limb lock structures comprise a pawl and the one or more upper limb lock structures comprise a rack, or vice-versa.

5. The upper body support system of claim 1, each passive upper body support assembly, further comprising:
a compliant mechanical joint device coupled between the harness assembly and the extensible body support limb assembly and constraining the extensible body support limb to rotate with respect to the harness assembly about one or more compliant joint axes, each with an adjustable stiffness.

6. The upper body support system of claim 1, wherein the compliant mechanical joint device is coupled to the harness assembly or to the extensible body support limb assembly.

7. The upper body support system of claim 1, each of the passive upper body support assemblies further comprising:
a removeable end-effector assembly removably coupled to the lower limb structure, the removeable end-effector assembly including:
a quick-change coupler removably coupled to the lower limb structure, wherein the quick-change coupler is configured to be coupled to the lower limb structure and decoupled from the lower limb structure by the human user without tools; and
an end-effector in contact with the working environment.

8. The upper body support system of claim 7, the removeable end-effector assembly also including:
a swivel mechanism coupled to the quick-change coupler and coupled to the end-effector, the swivel mechanism constraining the end-effector to rotate with respect to the quick-change coupler about one or more axes of rotation.

9. The upper body support system of claim 7, wherein the end-effector structure is coupled directly to the quick-change coupler, and wherein the quick-change coupler constrains the end-effector structure to rotate with respect to the quick-change coupler about one or more axes of rotation.

10. The upper body support system of claim 7, wherein the end-effector includes a clamping mechanism removeably attached to the working environment.

11. An upper body support system, comprising:
a harness assembly configured to be removably attached to a torso of a human user;
a plurality of passive upper body support assemblies each coupled to the harness assembly, wherein a first of the plurality of passive upper body support assemblies is configured to be coupled to the harness assembly on a first side of the torso of the human user, and wherein a second of the plurality of passive upper body support assemblies is configured to be coupled to the harness assembly on a second side of the torso of the human user opposite the first side, wherein each of the plurality of passive upper body support assemblies includes:
an extensible body support limb assembly extending toward a surface of a working environment, the extensible body support limb assembly including:
an upper limb structure;
a lower limb structure configured to move linearly with respect to the upper limb structure along a limb extension axis; and
a removeable end-effector assembly removably coupled to the lower limb structure, the removeable end-effector assembly including:
a quick-change coupler removably coupled to the lower limb structure, wherein the quick-change coupler is configured to be coupled to the lower limb structure and decoupled from the lower limb structure by the human user without tools; and
an end-effector in contact with the working environment.

12. The upper body support system of claim 11, the removeable end-effector assembly also including:
a swivel mechanism coupled to the quick-change coupler and coupled to the end-effector, the swivel mechanism constraining the end-effector to rotate with respect to the quick-change coupler about one or more axes of rotation.

13. The upper body support system of claim 11, wherein the end-effector structure is coupled directly to the quick-change coupler, and wherein the quick-change coupler constrains the end-effector structure to rotate with respect to the quick-change coupler about one or more axes of rotation.

14. The upper body support system of claim 11, wherein the end-effector includes a clamping mechanism removeably attached to the working environment.

15. An upper body support system, comprising:
a harness assembly configured to be removably attached to a torso of a human user;
a plurality of passive upper body support assemblies each coupled to the harness assembly, wherein a first of the plurality of passive upper body support assemblies is configured to be coupled to the harness assembly on a first side of the torso of the human user, and wherein a second of the plurality of passive upper body support assemblies is configured to be coupled to the harness assembly on a second side of the torso of the human user opposite the first side, wherein each of the plurality of passive upper body support assemblies includes:
a shoulder joint and brake device coupled between the harness assembly and an extensible body support limb assembly and constraining the extensible body support limb assembly to rotate with respect to the harness assembly about one or more joint axes, the shoulder joint and brake device including one or more shaft brake assemblies each configured to fix an orientation of the extensible body support limb assembly with respect to the harness assembly in an engaged configuration and to free the extensible body support limb assembly to rotate with respect to the harness assembly about the one or more joint axes in a disengaged configuration; and
a brake control device accessible by a hand of the human user positioned on a handle of the extensible body support limb assembly, wherein a first position of the brake control device engages the one or more shaft brake assemblies causing the one or more shaft brake assemblies to fix an orientation of the extensible body support limb assembly with respect to the harness assembly, and wherein a second position of the brake control device disengages the one or more shaft brake assemblies to free the extensible body support limb assembly to rotate with respect to the harness assembly about the one or more joint axes.

16. The upper body support system of claim 15, the extensible body support limb assembly, further comprising:
an upper limb assembly including an upper limb structure and one or more upper limb lock structures; and
a lower limb assembly including:
a lower limb structure configured to move linearly with respect to the upper limb structure along a limb extension axis, the handle coupled to the lower limb structure such that a hand of the human user can be positioned to grip the lower limb structure,
one or more lower limb lock structures coupled to the lower limb structure, and
a limb lock control device accessible by a hand of the human user positioned on the handle, wherein a first position of the limb lock control device engages the one or more upper limb lock structures with the one or more lower limb lock structures and fixes a position of the upper limb structure with respect to the lower limb structure along the extension axis, and wherein a second position of the limb lock control device disengages the one or more upper limb lock structures from the one or more lower limb lock structures and frees the lower limb structure to move linearly with respect to the upper limb structure along the extension axis.

17. The upper body support system of claim 16, wherein the one or more lower limb lock structures comprise a pawl and the one or more upper limb lock structures comprise a rack, or vice-versa.

18. The upper body support system of claim 15, each passive upper body support assembly, further comprising:
a compliant mechanical joint device coupled between the harness assembly and the extensible body support limb assembly and constraining the extensible body support limb to rotate with respect to the harness assembly about one or more compliant joint axes, each with an adjustable stiffness.

19. The upper body support system of claim 15, each of the passive upper body support assemblies further comprising:
a removeable end-effector assembly removably coupled to the lower limb structure, the removeable end-effector assembly including:
a quick-change coupler removably coupled to the lower limb structure, wherein the quick-change coupler is configured to be coupled to the lower limb structure and decoupled from the lower limb structure by the human user without tools; and
an end-effector in contact with the working environment.

20. The upper body support system of claim 19, the removeable end-effector assembly also including:
a swivel mechanism coupled to the quick-change coupler and coupled to the end-effector, the swivel mechanism constraining the end-effector to rotate with respect to the quick-change coupler about one or more axes of rotation.

* * * * *